United States Patent

[11] 3,544,778

[72] Inventor Charles G. Masters, Jr.
St. Petersburg, Florida
[21] Appl. No. 686,642
[22] Filed Nov. 29, 1967
[45] Patented Dec. 1, 1970
[73] Assignee Westinghouse Electric Corporation
Pittsburgh, Pennsylvania
a corporation of Pennsylvania

[54] DECISION NETWORK
7 Claims, 4 Drawing Figs.
[52] U.S. Cl. .................................................. 235/153,
340/146.1; 307/204; 307/219
[51] Int. Cl. ...................................................... G05b 23/02
G06f 15/16; H06k 19/26
[50] Field of Search .......................................... 235/153;
340/146.1; 307/219, 235, 242; 328/117, 154, 163

[56] References Cited
UNITED STATES PATENTS
3,412,261 11/1968 Hickin et al. .................. 307/219

OTHER REFERENCES
Moreines, H. et al., Majority Voting Protects Aircraft and Pilot. In Electronics. 37(16): p. 85— 91. May 18, 1964. TK7800.E58.

Primary Examiner—Eugene G. Botz
Assistant Examiner—R. Stephen Dildine, Jr.
Attorneys—F. H. Henson, E. P. Klipfel and Dean Schron ABSTRACT: A plurality of input lines receive nominally identical redundant analog signals. Each line includes an analog transmission gate which, when open, passes a respective input signal to a mean signal circuit which provides an output signal proportional to the average of the input signals. The input analog signals are also fed to a median signal circuit which provides an output signal proportional to the median input analog signal. The outputs of the mean and median signal circuits are compared and any predetermined difference is sensed by a control network which closes the analog transmission gate receiving the erroneous signal causing the predetermined difference.

INVENTOR
Charles G. Masters, Jr.
BY
ATTORNEY

3,544,778

DECISION NETWORK

BACKGROUND OF THE INVENTION

1. Field of the Invention

This invention in general relates to decision networks, and particularly to a network for use in analog signal processing systems for deriving an output signal in response to a plurality of analog input signals which are nominally identical, but which in actuality may vary from one another with respect to phase, amplitude, or the like.

2. Description of the Prior Art

Various electronic systems require that a single useful output signal be provided in response to a plurality of nominally identical input signals, that is, so-called identical signals which in actuality are subject to possible deviation from one another because of some equipment component failure or transmission channel distortion.

As typical examples, redundant analog computers and redundant analog control systems are illustrative of two electronic systems which would require the derivation of a single "correct" output signal.

One type of decision network for a redundant system involves the use of a set of current limiting nonlinear resistance elements each connected in a respective line receiving an input analog signal, with all elements being connected together at a common junction point. The ideal voltage current characteristic curve for the nonlinear resistance element is such that for any positive or negative voltage across the element, it will pass a positive or negative saturation current and if the input analog signals are not identical there will be provided at the common junction point an output signal which is the median of the input signals. One disadvantage of this type of system is that input signals slightly displace in phase and/or amplitude can cause serious frequent deviations in the output signal.

Another type of decision network derives a time average signal value for each input and for the weighted sum of the inputs. The difference between the individual signal average and the weighted sum average is then used to control the future transmission of signals through various inputs. In such decision networks there is required a complex comparator circuit for each input line in order that each input be compared with the average. Additionally, averaging over a predetermined period of time requires rectifier and integrator circuits for each input line in addition to a delay unit for the input signals.

If, in the averaging type of system where each input signal is compared with the average of the input signals, two input signals should fail in a complementary manner, that is one signal goes high while the other goes low, both signals will be eliminated from consideration whereas in actuality the failures may have been momentary and the signals would have contributed significantly accurate information subsequent to the complementary failure.

It is an object of the present invention to provide an improved decision network particularly well adapted for analog signal systems, which network will provide a continuously correct output signal in the presence of erroneous input signals.

Another object is to provide a decision network which eliminates the need for many complex comparator circuits.

Another object is to provide a decision network which will provide a correct output signal even in the presence of noneliminated complementary failure input signals.

SUMMARY OF THE INVENTION

A plurality of input lines receive respective redundant input analog signals, with each line including a gating means which, when open, permits passage of a respective input signal and when closed, supresses passage of said signal. A mean signal circuit is responsive to the signals passed by the gating means for providing an output signal proportional to the instantaneous average of the signals so passed. Operating concurrently with the mean signal circuit is a median signal circuit which provides a comparison signal substantially equivalent to the median input signal. A control circuit means which is responsive to a predetermined difference between the output signal and the comparison signal operates to close the gating means receiving the erroneous signal causing the predetermined difference.

DESCRIPTION OF THE PREFERRED EMBODIMENTS

Figure 1:
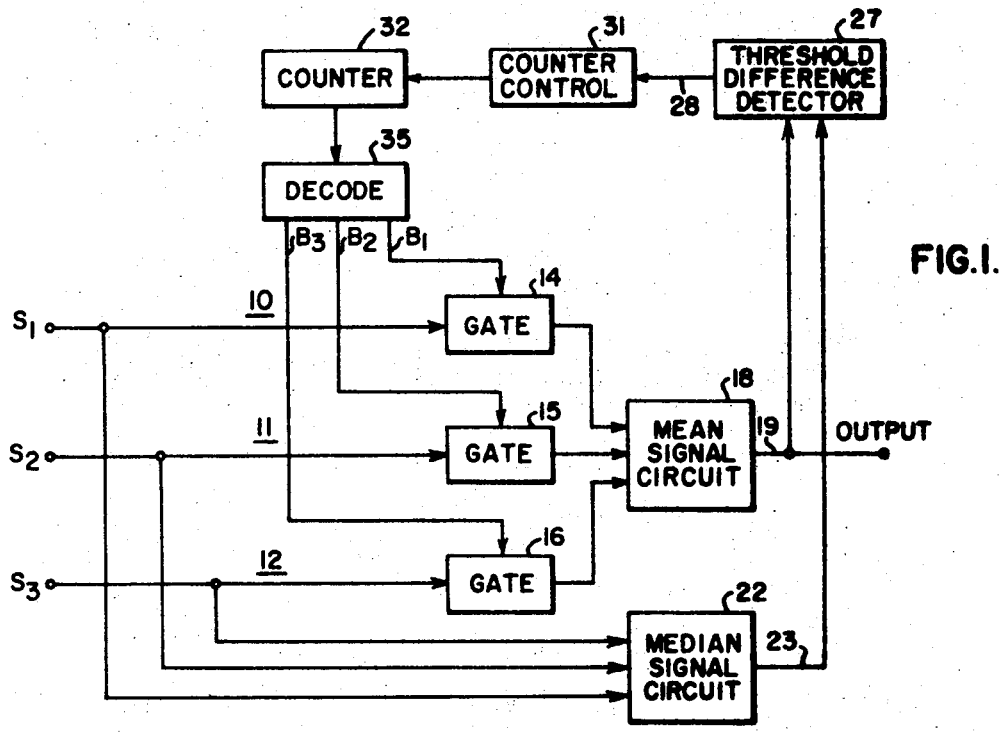
FIG. 1 illustrates, in block diagram form, an embodiment of the present invention.

The decision network of FIG. 1 includes a plurality of input lines 10, 11 and 12 for receiving input analog signals $S_1$, $S_2$ and $S_3$ respectively. Each input line includes a controlled gating means in the form of analog transmission gates 14, 15 and 16 for input lines 10, 11 and 12 respectively, with each gate being operable to pass a respective input analog signal when the gate is open.

After being passed by the analog transmission gates 14, 15 and 16, the input signals $S_1$, $S_2$ and $S_3$ are fed to a mean signal circuit 18 which provides, on output lead 19, an output signal which is proportional to the instantaneous average of the signals so received. Mean signal circuits which provide an output signal proportional to the average of the input signals received are well known to those skilled in the art.

In addition to the mean signal circuit 18, there is included a median signal circuit 22 for providing, on lead 23, a comparison signal substantially equivalent to the median of the input signals $S_1$, $S_2$ and $S_3$.

As used herein, mean is defined as an average, whereas median is defined as a middle value in a given series. As an example, in the series of numbers 1, 3, 4, 8 and 9, the means or average would be 5 whereas the median would be 4 since it is the middle value in the series. Before continuing with the explanation of the decision network of FIG. 1 reference should now be made to FIGS. 2 and 3 for a better understanding of one type of median signal circuit which may be utilized herein.

Figure 3:
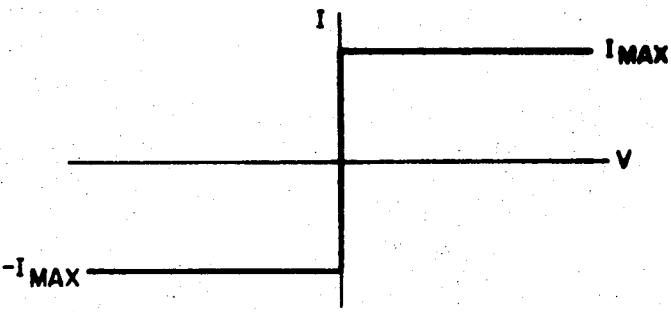
FIG. 3 illustrates the current-voltage characteristic curve of a nonlinear resistance element of FIG. 2.

The circuit includes a plurality of input lines 1, 2, ... $n$, wherein $n$ for the case of FIG. 1 equals 3. Each line includes a current limiting nonlinear resistance means one end of which is connected to the common output line 23 at which is developed the comparison signal in response to the plurality of input signals. Each of the nonlinear resistance means has an ideal voltage-current characteristic curve as illustrated in FIG. 3, where I represents the current through, and V represents the voltage across the nonlinear resistance means. It is seen that for any positive voltage drop across the nonlinear resistance means, as saturation current having a value of $I_{MAX}$ will flow therethrough, and for any negative voltage difference, a saturation current of $-I_{MAX}$ will flow therethrough. A voltage current characteristic curve such as shown in FIG. 3 may be obtained, for example, utilizing different arrangements of diodes, transistor elements, or pentode tubes, with proper voltages applied.

Figure 2:
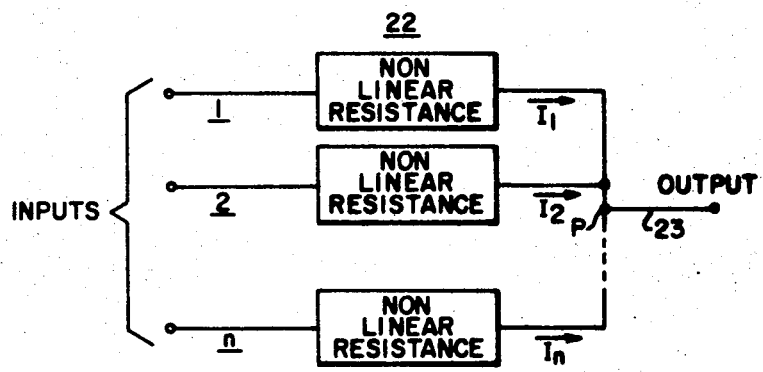
FIG. 2 illustrates one form of median circuit which may be used in the embodiment of FIG. 1.

Ideal operation of the median signal circuit of FIG. 2 is as follows: With a plurality of input signals, it is possible that some deviation between the signals may occur such that there is a median voltage and are as many input voltages above the median voltage as there are below it. The voltage inputs above the median voltage will each supply current of $I_{MAX}$ to the circuit point P whereas the voltage inputs below the median will each drain $I_{MAX}$ away from the circuit point P. By applying Kirkoff's Law on the sum of the currents at circuit point P, it is seen that the Law is satisfied if the input signal providing the median voltage provides zero current and the output voltage therefore must equal the median voltage since there is no voltage drop across its associated nonlinear resistance means.

From the voltage current curve of FIG 3, it is seen that with no voltage drop across the nonlinear resistance, any current up to $\pm I_{MAX}$ may flow through it; such is the case when several input signals have identical values. For example, suppose that with three lines, lines 1 and 2 receive at an instant of time, signals having a value of 10, and the remaining line receives an input signal having a value of 5. The median output signal will be 10 and the voltage drop across the third nonlinear resistance means will be such as to drain $I_{MAX}$ away from the common connection 4. Although the voltage drop across the nonlinear resistance means will be such as to drain $I_{MAX}$ away from the common connection 4. Although the voltage drop across the nonlinear resistance means in lines 1 and 2 is zero, any current up to $I_{MAX}$ may flow therethrough, the sum of $I_1 + I_2$ (FIG. 2) being equal to the absolute value of the $I_{MAX}$ current in the third input line. If the first line receives a signal value of 10, the second a signal value of 9, and the third a signal value of 5, the current through the first nonlinear resistance means will be $+I_{MAX}$ and the current through the nonlinear resistance means in the third line will be $-I_{MAX}$ and the median output will have a value of 9.

Returning now to the explanation of FIG. 1, if all of the input analog signals are equal, the output signal on lead 19 from the mean signal circuit 18 will be substantially equal to the comparison signal on lead 23 from the median signal circuit 22. Should the input signals deviate slightly, within tolerable limits, the output signal, which is proportional to the average, and the median signal, which is equivalent to the median, will be somewhat different, however the signal passed on to a subsequent stage or other utilization device, not shown, will be the output signal on lead 19. Should one of the input signals become abnormal, that is deviate by more than an acceptable amount, the output signal and the comparison signal will disagree by more than a predetermined fixed amount. In order to effectively eliminate the abnormal signal, there is provided a control circuit means which senses the predetermined difference between the output and comparison signals and functions to close the respective analog transmission gate receiving the abnormal signal which gate when closed, appears as an open circuit (i.e. an infinite impedance) to the rest of the network.

By way of example, the control circuit may perform its function with the provision of threshold difference detector means 27 which provides an output control signal on lead 28 when the output signal on lead 19 and the comparison signal on lead 23 differ by a predetermined amount. The control signal on lead 28 is present as long as the said predetermined difference exists, and is utilized to initiate a scanning operation in which the gages 14, 15 and 16 are sequentially and momentarily closed to block passage of a respective input signal. The scanning operation may be accomplished by the provision of the counter control 31 which triggers the counter 32 into its counting function when the control signal on lead 28 is present. As the counter 32 progresses in its counting function, a decode network 35 senses the output thereof to provide an output blocking signal on only one respective output lead $B_1$, $B_2$ and $B_3$ in accordance with a respective unique count in counter 32. A Blocking signal on lead $B_1$ closes the gate 14 while gates 15 and 16 remain open; a blocking signal on lead $B_2$ closes the gate 15 while gates 14 and 16 remain open, obviously other arrangements are possible. For example enabling signals may be normally provided to keep the gates opened and may be sequentially removed in the scanning operation.

In a typical operation, the gates 14, 15 and 16 are open and let it be assumed that the input signals $S_1$, $S_2$ and $S_3$ are identical or nearly identical. The mean signal circuit 18 provides the output signal which is an average of the input signals and the median signal circuit 22 provides the comparison signal which is the median of the input signals. The threshold difference detector 27 receiving the output and comparison signals senses that they are within prescribed limits and consequently no control signal is provided on lead 28.

Suppose that at some point in the operation one of the input signals, for example, $S_3$ reverts to a failed or some other abnormal condition. The mean signal circuit 18 will provide an output signal which is substantially less than the average before the failure of $S_3$, whereas the median signal circuit 22 will provide the same output signal (either $S_1$ or $S_2$) as before the failure. Assuming that the difference between the output and comparison signals is above a predetermined limit, the threshold difference detector 27 provides a control signal to initiate the counter 32 into its counting function. On the first count, a blocking signal is provided to gate 14 to eliminate the signal $S_1$ from the averaging operation in the mean signal circuit 18. With gate 14 closed the output signal and comparison signals will still differ by an amount such that the threshold difference detector 27 still provides the control signal and the counter 32 then advances to the next count such that the gate 14 is open and the gate 15 is closed. As was the case with the closing of gate 14, the closing of gate 15 does not alter the input conditions to the threshold difference detector 27 and the counter 32 then advances to its next count whereby a blocking signal is provided to gate 16 to close it. With the gate 16 closed, the abnormal signal $S_3$ is eliminated from the averaging operation in the mean signal circuit 18, and consequently the output signal and the comparison signal are again within acceptable limits such that the threshold difference detector 27 no longer provides a control signal and the counter control 31 stops and locks the counter 32 whereby a permanent blocking signal is provided to the gate 16.

The apparatus of FIG. 1 is operable with three redundant input analog signals. For systems utilizing a greater number of redundant signals, additional circuit means are provided to not only remove the effect of an abnormal signal but to additionally allow the scanning function for the elimination of a plurality of abnormal signals should such events occur, and to this end reference is now made to FIG. 4.

Figure 4:
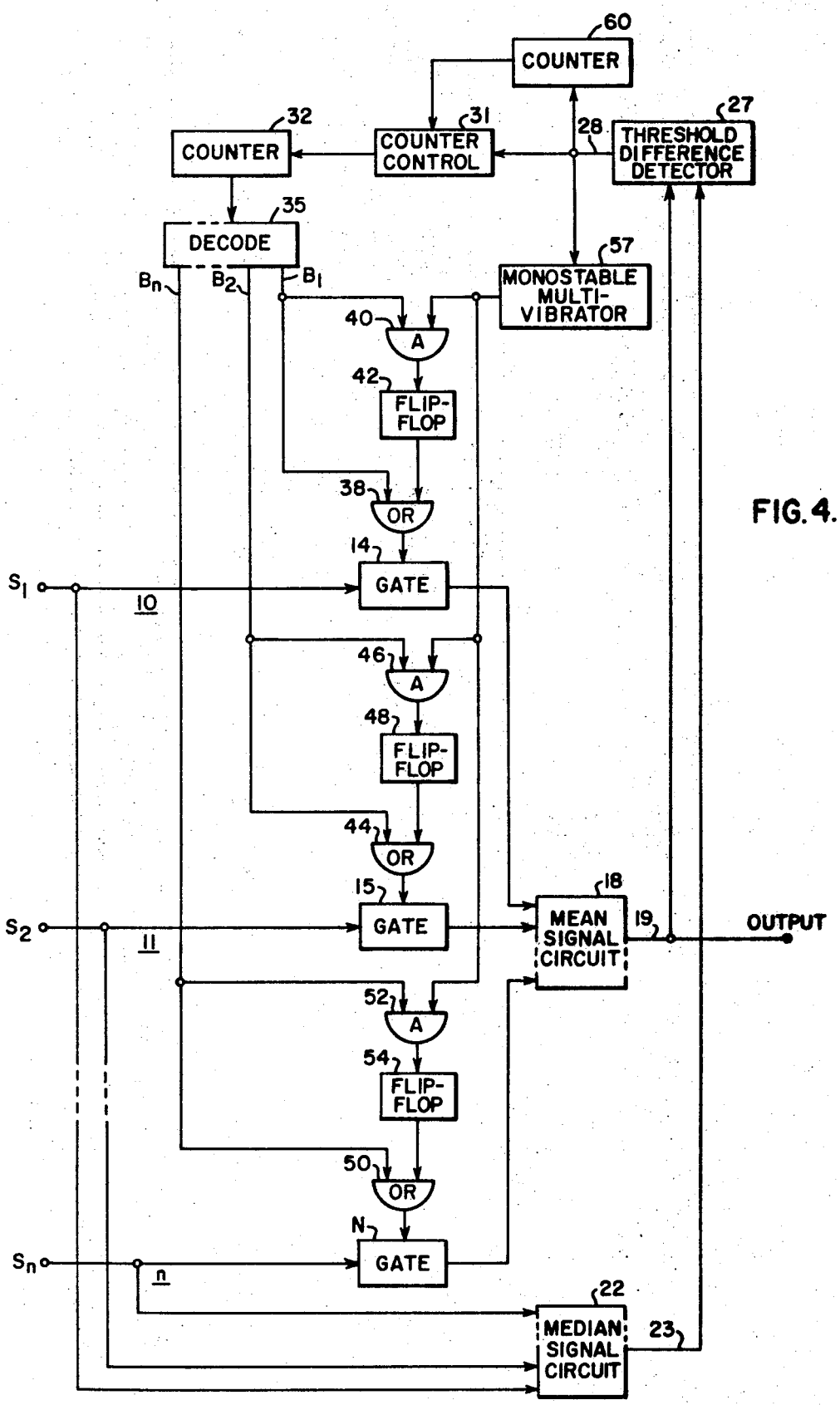
FIG. 4 illustrates another embodiment of the present invention.

Various circuits in FIG. 4 are similar to those in FIG. 1 and accordingly have been given like reference numerals. A plurality of input lines 10, 11 ... n are provided for receiving respective redundant input analog signals $S_1$, $S_2$ ... $S_n$. Each input line includes a respective analog transmission gate 14, 15, ... N for passing the input signals through to the mean signal circuit 18 which provides on output lead 19 an output signal which is the mean or average of the input signals received. As in FIG. 1, the circuit of FIG. 4 includes the median signal circuit 22 for providing a comparison signal on lead 23 to the threshold difference detector 27.

Each of the gates 14, 15 ... N includes a latching circuit which allows the elimination of not only a first abnormal signal, but in addition allows subsequent scanning of the gates for the elimination of any subsequent abnormal input signal. By way of example, the latching circuit for gate 14 includes an OR gate 38 which will provide an output signal when any one of its two input signals is present, AND gate 40 which will provide an output trigger signal only when both of its input signals are present, and a flip-flop 42 which will provide an output holding signal to the OR gate 38 when triggered by an output from the AND gate 40. In a similar fashion, the latching circuit of gate 15 includes OR gage 44, AND gate 46, and flip-flop 48, and the latching circuit for gate N includes OR gate 50, AND gate 52, and flip-flop 54.

Included in the control circuit is a monostable multivibrator 57 which is operable to provide an output latching signal, for a predetermined period of time, simultaneously to AND gates 40, 46 and 52 each time that the threshold difference detector 27 turns off and the control signal is removed, to aid the latching circuit in the permanent closure of a gate receiving an abnormal signal.

Upon the occurrence of an abnormal signal the threshold difference detector 27 will provide a control signal as was the case with respect to the network of FIG. 1. The control signal initiates the counting function such that blocking signals are uniquely provided on lines $B_1$, $B_2$ ... $B_n$ in a sequential manner. A blocking signal on lead $B_1$ is fed to AND gate 40 at the same time that OR gate 38 receives the signal. Since the monostable multivibrator 57 is not providing an output latching signal, flip-flop 42 does not receive a set trigger signal from AND gate 40. OR gate 38 in response to the blocking signal provides an output signal to close the gate 14. If the abnormal signal is $S_n$, the control signal provided by the threshold difference detector 27 is still provided even though gate 14 is closed and consequently on the next count of counter 32 the blocking signal on line $B_2$ will be provided to AND gate 46 and to OR gate 44 which provides an output signal to close the gate 15. Sequential blocking signals are provided up to the $N^{th}$ gate whereupon the blocking signal on lead $B_n$ causes OR gate 50 to close the gate N. Since the abnormal signal is therefore eliminated from consideration the control signal on lead 28 is no longer provided by the threshold difference detector 27. The shutting off of the threshold difference detector 27 and the removal of the control signal is sensed by the monostable multivibrator 57 which then provides an output latching signal, which, when provided to AND gate 52, operates in conjunction with the blocking signal on lead $B_n$ to cause the AND gate 52 to provide a trigger signal to flip-flop 54 thus placing it in a set condition in which an output holding signal is permanently supplied to OR gate 50 to keep the gate N closed. The monostable multivibrator 57 thereafter reverts to an off condition.

The counter control 31 may be operable after a gate has been permanently closed to reset the counter for a next scanning function upon the possible occurrence of a subsequent abnormal signal. The resetting by the counter control 31 may be in response to various signals such as the turning off of threshold difference detector 27.

A subsequent abnormal signal such as $S_2$ will be eliminated from the decision network when its respective flip-flop 48 is placed into a set condition by virtue of the simultaneous occurrence of the latching and blocking signals to AND gate 46.

If desired, provisions may be made in the decision network such that at least two input lines will remain open subsequent to abnormal signal occurrences on the remaining lines. This may be accomplished by the provision of a counter 60 which will advance one count each time a control signal is provided on lead 28 and will provide an output signal on the count of $n-2$ to block the counter control means 31 to prevent the counter 32 from initiating a counting function.

Accordingly, there has been described a decision network particularly adapted for redundant analog signal systems wherein the mean and the median of the input signals are utilized in a control network to eliminate the effects of a failed or abnormal input signal. Although the present invention has been described with a certain degree of particularity, it should be understood that the present disclosure has been made by way of example and that modifications and variations of the present invention are made possible in the light of the above teachings.

I claim:

1. A decision network for a redundant analog signal system comprising:
    A. a plurality of input lines for receiving input analog signals;
    B. controlled gating mean connected in each said line for passing a respective input signal;
    C. a mean signal circuit operatively connected to said gating means for providing an output signal proportional to the average of the signals passed by said gating means;
    D. a median signal circuit operatively connected with said input lines for providing a comparison signal substantially equivalent to the median signal of said input signals; and
    E. control circuit means responsive to a predetermined difference between said output signal and said comparison signal, due to an abnormal input signal, for closing the blocking transmission of signals through gating means in the line containing said abnormal input signal.

2. A network according to claim 1 wherein the control circuit means includes:
    1. scanning means for individually and momentarily sequentially closing the controlled gating means of the input lines; and
    2. threshold detector means operatively connected to the mean and median signal circuits for providing a control signal to initiate said scanning means, when the difference between the output and comparison signal exceeds a predetermined threshold.

3. A network according to claim 2 wherein:
    A. the scanning means includes a counter; and
    B. each controlled gating means closes in response to a unique count of said counter.

4. A network according to claim 3 wherein:
    A. the scanning means additionally includes a decode network having a plurality of output leads;
    B. each one of the controlled gating means being connected to a respective one of said output leads; and
    C. said decode network being operable to provide a blocking signal on a first of said output leads in response to one count of the counter, and being operable to provide said blocking signal subsequent output leads in response to respective subsequent counts of the counter.

5. A network according to claim 3 wherein means are provided for maintaining the counter at the particular count at which the controlled gating means receiving the abnormal signal, is closed.

6. A network according to claim 2 wherein the control circuit includes, latching means for holding the controlled gating means in the line containing the abnormal signal, closed, subsequent to the removal of the control signal.

7. A network according to claim 6 wherein:
    A. the scanning means provides individual blocking signals to respective controlled gating means; and
    B. the latching means includes:
        1. first circuit means for providing a latching signal in response to the removal of the control signal;
        2. second circuit means for providing a holding signal in response to an input signal;
        3. a first gate for receiving and passing either one of, a respective blocking signal or said holding signal; and
        4. a second gate for providing said trigger signal in response to both said respective blocking signal and said holding signal.